Oct. 5, 1948.  J. D. DONALDSON  2,450,644
MAXIMUM LOAD INDICATING GAUGE
Filed Dec. 9, 1946
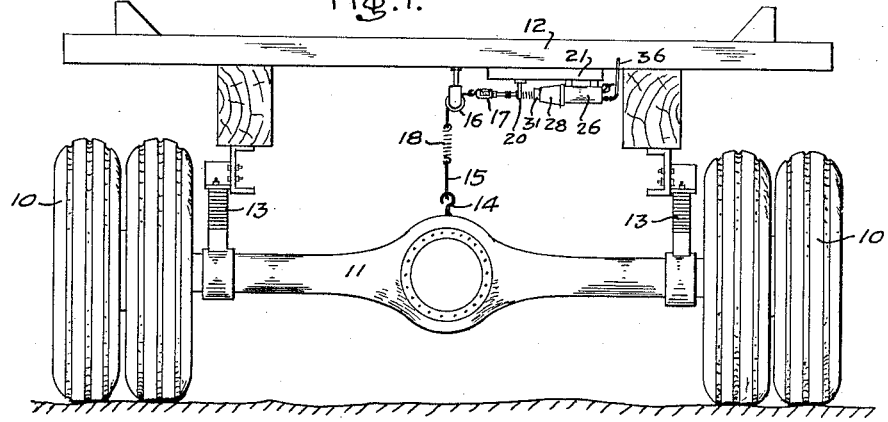
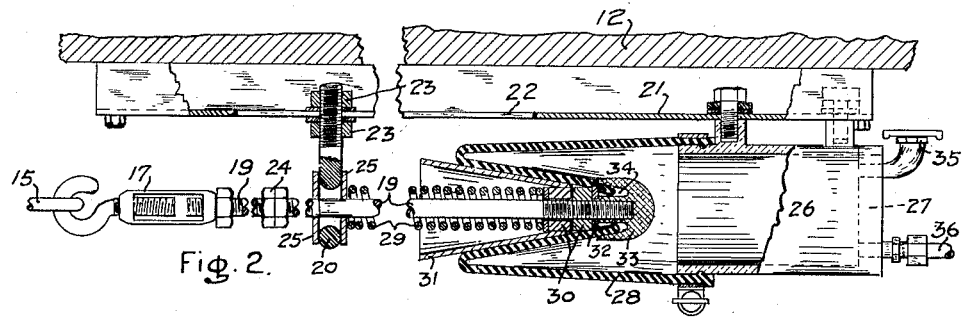
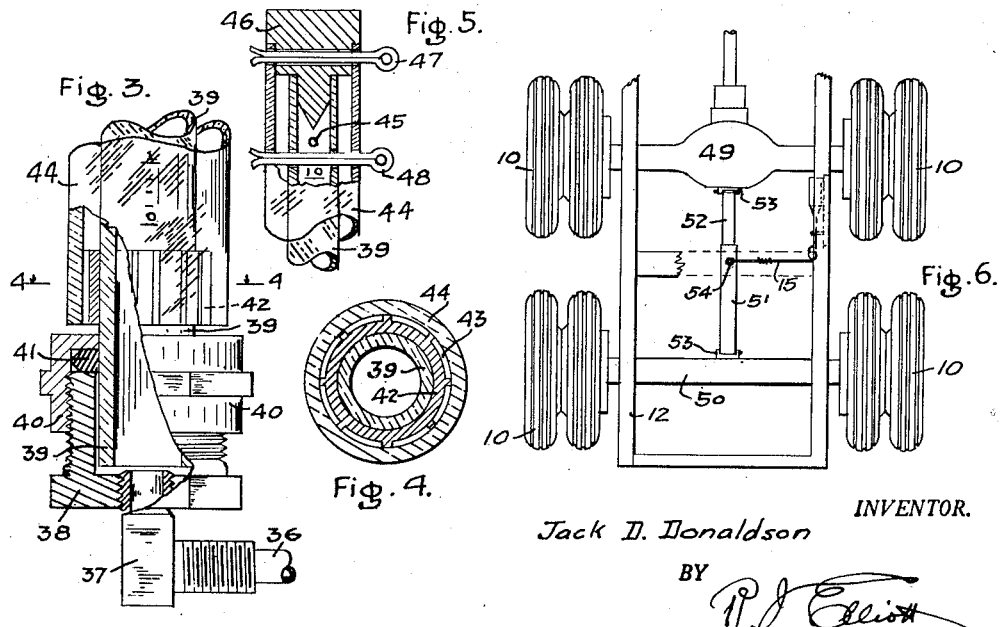
INVENTOR.
Jack D. Donaldson
BY Patented Oct. 5, 1948

2,450,644

UNITED STATES PATENT OFFICE 2,450,644

MAXIMUM LOAD INDICATING GAUGE

Jack D. Donaldson, Tacoma, Wash.

Application December 9, 1946, Serial No. 714,966

5 Claims. (Cl. 265—42)

This invention relates to means for determining whether, in loading a vehicle, the load approaches the maximum allowed by the authorities, in order to prevent overloading such vehicle.

The objects of my invention are to provide such an apparatus as will be rugged in construction so as to stand the rough usage common to hauling logs, and other heavy freight; as will not be required to measure the load in small units; nor until the vehicle has been loaded with a relatively small percentage of its legal capacity; but will then begin to register until it is fully loaded; which can be adjusted to make the same readings for the same loads independent of the stiffness or weakness of the vehicle springs; in which the indicating gage may be located at any convenient location; and in which atmospheric pressure alone is applied to the registering fluid. A further object is to provide an apparatus which is inexpensive to make, highly efficient in use and automatic in action. Another object is to provide means whereby the entire apparatus may be disconnected from the truck if it is not needed.

I attain these and other objects as will readily appear to those familiar with the art, by the devices, mechanisms, and arrangements illustrated in the accompanying drawings, in which—

Fig. 1 is a rear elevation of a truck axle showing my apparatus mounted thereon; Fig. 2 is a longitudinal section of the operating parts of my invention; Fig. 3 is a view, partly in section, of the lower end of the indicating gage; Fig. 4 is a cross-section thereof taken on the line 4—4 in Fig. 3; Fig. 5 is a view of the upper end of the indicating gage; and Fig. 6 is a plan showing my apparatus as applied to a six-wheel truck.

Similar numerals of reference refer to similar parts throughout the several views.

In many States strict limits are placed on the maximum load permitted on trucks, dependent on several conditions, and if a driver is found with a load exceeding the limit allowed for his vehicle he is liable to severe penalties. However, if his load consists only of a few heavy items, such as logs, it is difficult for him to know how great a weight he can add to the load already taken, in order to carry his full capacity, and no more; in other words, to keep from losing money either by carrying too low a load or by being caught with an overload and fined by the authorities. He is, of course, not interested in the weights first applied to his truck but only in the weight added when they approach his legal capacity.

For this reason I have invented a load indicator which may be adjusted to only register after the load has reached a selected percentage of his permitted capacity. This indicator may be placed in the cab of the truck, or in any other convenient place and, when once adjusted for his maximum load, will always read the same for each similar load under the same conditions.

However, readings may vary slightly with changes in the temperature and elevation, but these variations will be small and may be noted and compensated for by the driver as he reads the indicator, for instance, if 95% of his load would read 9½" on his gage in the cool of the morning, it would probably read 10" during the warmer part of the day, and the driver can easily make the required allowance in reading his gage.

As shown in Fig. 1, the truck is mounted on the usual wheels 10 secured to the axles in the axle casing 11, which is connected to the body or frame of the truck 12, by leaf springs 13. The load is applied to the truck body 12 and is resiliently supported by the said springs 13 which, therefore, give way in proportion to the load and in accordance with their strength or stiffness.

A hook 14 is attached to the center of the axle casing 11 and is adapted to receive and retain a loop in the end of the cable 15. This cable 15 extends vertically upward to a small pulley 16 secured to the lower surface of the body 12 immediately above the said hook 14.

The upper end of the said cable 15 is secured to a turnbuckle 17. A shock-absorbing spring 18 is interposed in the cable 15 between the hook 14 and the turnbuckle 17.

The other end of the turnbuckle 17 is screwed on a rod 19 which passes freely through a supporting eye-bolt 20. A channel iron 21 is secured under the body 12, with its legs extending upward, and is provided with a longitudinal slot 22 therein. The eye-bolt 20 is slidably mounted in said slot 22 and is held in adjusted position in said slot by means of nuts 23.

A pair of stop nuts 24 are adjustably screwed on the rod 19 between the turnbuckle 17 and the eye-bolt 20. A pair of washers 25 are loosely mounted on said rod 19 on each side of said eye-bolt 20.

A cylinder 26, having a closed end 27, is mounted under the channel 21 and is fixedly secured thereto. The other end of the cylinder 26 is closed by a flexible conical sleeve 28, preferably made of rubber or its equivalent, which is secured firmly at its largest end to the open end of the cylinder 26. The cylinder and its sleeve are coaxial with the said rod 19.

The rod 19 is screw-threaded at its end and passes centrally through a coiled compression spring 29 mounted between the washer 25 of the eye-bolt 20 and the lock-nuts 30 near the end of the rod 19. A cone 31, of plastic or other suitable material, is passed over the nuts 30 and extends with its large end rearward, over the spring 29.

A washer 32 is placed against the nuts 30. A brass cap 33, having an annular cavity 34 around its core, is provided. The narrow end of the conical sleeve 28 is reversed and is forced into the cavity 34 of the cap. Then the cap 33 is screwed on to the end of the rod 19 until the washer 32 engages and tightly clamps the end of the sleeve 28 between it and the cap 33.

The action of the cone 31 is to hold the inturned portion of the sleeve 28 out from collapsing against the spring 29. The effect of this form of flexible extension to the container 26 is that the further the rod extends into the sleeve the greater the proportion of the oil displaced from the container is to the linear movement of the rod, in other words, a movement of the rod of one inch, when it is at its extreme outer position, may mean a reading of six inches on the indicator but, when the rod is at its other extreme position, a movement of an inch may mean a reading of sixteen inches on the indicator. This effect would be less marked if the cone 31 were omitted.

A bleeder valve 35 is screwed into the end 27 of the cylinder 26, and a pipe 36 also extends therefrom to the indicating means in the cab, or elsewhere. The sleeve 28, the cylinder 26 and the pipe 36 are filled with a liquid which most conveniently may be oil.

The pipe 36 leads to a fitting 37 which is screwed into the lower end of a screw-threaded hollow nut 38, into which the lower end of a transparent indicator tube 39 passes. An outer nut 40 screws on the outside of the nut 38 and compresses a rubber ring or gasket 41, which surrounds the tube 39 and lies between the nuts 38 and 40, thus making a leak-proof joint between the pipe 36 and the tube 39. An annular ring 42 surrounds the tube 39 a short distance above the nut 40 and has grooves or air passages 43 around its outer surface. This ring 42 fits in the outer transparent tube 44. This outer transparent tube 44 extends upward from a point slightly above the upper nut 40 to a point above the upper end of the tube 39.

As seen in Fig. 5, the indicator tube 39 is provided with an air hole 45 which communicates with the inside of the outer tube 44. A cap 46 fits in the upper end of the inner tube 39 and in the outer tube 44 and is attached thereto by a removable pin 47, or otherwise. The two tubes are secured together by the removable pin 48.

The indicator tube 39 is provided with suitable markings whereby the height of the oil column therein may be read and the amount of the load needed to complete the full loading of the truck, estimated.

In adjusting and setting my apparatus for use when first applied to a particular vehicle it is necessary to know whether the leaf springs 13 are stiff or relatively weak. First, while the truck has only a comparatively small load, or none at all, the eye-bolt 20 is adjusted in the slot 22 to compress the spring 29 to its fullest extent, then oil is inserted until the sleeve 28, the container 26, the pipe 36 are full and the top of the oil in the indicator tube 39 reads "0." Then the full allowed load is placed on the truck and, if the springs 13 are stiff the turnbuckle 17 is adjusted to draw the said cap 33 further advanced into the inturned sleeve 28 while, if the springs 13 are weak, the turnbuckle 17 is adjusted so that the cap 33 is not so far in the sleeve 28. When the full load has thus been applied the oil has risen in the tube 39 and this is the reading for full load at that temperature and elevation and at that adjustment of the parts. The driver may later make allowance for the slight changes in the readings due to temperature and elevation changes.

It must be noted that, when the load is low and the spring 29 compressed to its fullest extent, the shock spring 18 will be stretched tighter as the load is reduced until the truck is empty, and will not permit the spring 29 to move the sleeve 28 to register on the indicator until sufficient load has been added to equalize the pull of the two springs 18 and 29. If the apparatus is not in use the cable 15 may be disconnected from the hook 14. The spring 29 will then expand until the stop nuts 24 engage the eye-bolt 20, at which time the indicator will read the same as when the maximum load is on the truck.

Referring to Fig. 6, which shows the rear of a six-wheel truck, it will be seen that I provide a bridge between the axle casings 49 and 50, said bridge being composed of two telescoping tubes 51 and 52, secured to the respective axle casings by suitable hinges 53, thus permitting the said casings 49 and 50 to roll slightly, for instance, when the truck is started. The tubes 51 and 52 permit a free motion of the two axles to accommodate any usual variation in the level of the ground, especially while loading. I attach the cable 15 in this case to the center 54 of the said bridge. In this way I am able to ascertain the load on the truck independent of the unevenness of the ground on which the two axles are supported.

It is, of course, to be understood that many changes may be made in the details of construction of my improved maximum load indicating gage, without departing from the spirit of my invention as outlined in the appended claims.

Having described my invention, what I claim and desire to secure by Letters Patent is:

1. In an apparatus of the class described, the combination with a vehicle having mounted thereon a container, an indicator, and a pipe joining the container with the indicator, said container and pipe being full of a liquid; of a flexible extension to said container; a spring acting to compress said flexible extension to force liquid therefrom into said indicator; and means to restrain said spring from acting, said restraining means acting in response to and in reverse proportion to variations in the load, whereby the greater the load the less the restraint and the more liquid is displaced into said indicator.

2. In an apparatus of the class described comprising a supporting structure, a frame supported from said structure by spring means and adapted to carry a load; in combination with a tension means mounted on said frame; a cable secured to said supporting structure and to said tension means and passing vertically upward from said supporting means to said frame, whereby variations in the load applied to said frame will cause said tension means to move; a container; a flexible sleeve extension to said container, said sleeve extension being secured to and moved by the movements of said tension means; a fluid filling said container and said sleeve; and means to indicate the liquid displaced from said container by the load applied to said frame.

3. An apparatus as set forth in claim 2, wherein said tension means comprises a compression spring engaging the flexible sleeve and based on said frame, and applying a tensile force to said cable.

4. An apparatus as set forth in claim 2, together with a shock spring in said cable and opposing said tension means, whereby said tension means is inactive until the load applied to said frame exceeds a predetermined amount.

5. An apparatus as set forth in claim 2, together with an eye-bolt secured to said frame; and wherein a rod is interposed between said cable and said tension means, said rod passing through said eye-bolt, and said tension means comprising a spring based on said eye-bolt and engaging the end of said rod.

JACK D. DONALDSON.

REFERENCES CITED

The following references are of record in the file of this patent:

UNITED STATES PATENTS

| Number | Name | Date |
| --- | --- | --- |
| 1,689,644 | Troll | Oct. 30, 1928 |
| 2,225,182 | Ratliff | Dec. 17, 1940 |

FOREIGN PATENTS

| Number | Country | Date |
| --- | --- | --- |
| 310,269 | Great Britain | Apr. 25, 1929 |
| 360,634 | Germany | Oct. 5, 1922 |